United States Patent [19]

Watanabe et al.

[11] Patent Number: 4,847,143

[45] Date of Patent: Jul. 11, 1989

[54] BINDER COMPOSITION AND NONWOVEN FABRICS AND IMPREGNATED PAPERS USING THE SAME

[75] Inventors: Katsuyoshi Watanabe, Nara; Takashi Miyaoka, Osaka; Takeo Oyamada, Chiba, all of Japan

[73] Assignee: Sumitomo Chemical Company, Limited, Osaka, Japan

[21] Appl. No.: 870,479

[22] Filed: Jun. 4, 1986

[30] Foreign Application Priority Data

Jun. 4, 1985 [JP] Japan ................... 60-121231
Jun. 7, 1985 [JP] Japan ................... 60-124709
Nov. 26, 1985 [JP] Japan ................... 60-265612

[51] Int. Cl.$^4$ .............. C08L 33/26; C08L 61/24; D06M 15/29; D06M 15/423
[52] U.S. Cl. ........................... 428/288; 8/181; 8/186; 162/135; 162/136; 162/166; 162/167; 162/168.3; 427/388.3; 427/388.4; 427/389.9; 427/391; 428/290; 428/505; 428/510; 428/514; 428/527; 428/530; 524/512; 524/555
[58] Field of Search ............... 427/388.3, 388.4, 389.9, 427/391; 428/288, 290, 505, 510, 514, 527, 530; 524/512, 555

[56] References Cited

U.S. PATENT DOCUMENTS

| | | | |
|---|---|---|---|
| 3,220,869 | 11/1965 | Ruemens et al. | 428/278 |
| 3,345,318 | 10/1967 | Lindemann et al. | 428/267 |
| 3,380,851 | 4/1968 | Lindemann et al. | 428/338 |
| 3,590,100 | 6/1971 | Weiland et al. | 8/186 |
| 3,597,380 | 8/1971 | Bertini et al. | 524/843 |
| 3,723,377 | 3/1973 | Spangler | 8/187 |
| 3,749,751 | 7/1973 | Pai | 8/187 |
| 4,300,898 | 11/1981 | North | 8/186 |
| 4,442,257 | 4/1984 | Borovicka et al. | 524/555 |
| 4,444,941 | 4/1984 | Borovicka et al. | 525/123 |
| 4,472,165 | 9/1984 | Gregorian et al. | 8/186 |
| 4,487,889 | 12/1984 | Craun | 524/512 |
| 4,525,535 | 6/1985 | Craun et al. | 524/512 |
| 4,540,735 | 9/1985 | Borovicka | 524/512 |
| 4,542,180 | 9/1985 | Carlson et al. | 524/512 |

FOREIGN PATENT DOCUMENTS 143175 5/1985 European Pat. Off. .
1564100 3/1968 France .
1361929 7/1974 United Kingdom .

OTHER PUBLICATIONS

Reid et al. I, *American Dyestuff Reporter*, vol. 51, No. 5, pp. 19–22 and 26, Mar. 5, 1962.
Reid et al. II, *American Dyestuff Reporter*, pp. 26–28, 32 and 34, Jun., 1970.
Vail et al., *Textile Research Journal*, vol. 43, pp. 294–299, May, 1973.

*Primary Examiner*—James C. Cannon
*Attorney, Agent, or Firm*—Sughrue, Mion, Zinn, Macpeak & Seas

[57] ABSTRACT

A binder composition is disclosed, which comprises:
(A) a copolymer emulsion which contains as its essential ingredients vinyl acetate, ethylene, and a monomer represented by the formula (1):

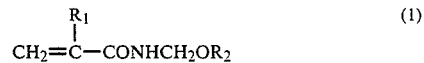

wherein $R_1$ is H or $CH_3$; and $R_2$ is H or an alkyl group having not more than 5 carbon atoms, the proportions of the respective ingredients being within the range of 55–96.5/3–40/0.5–5 on a weight basis;
(B) a formaldehyde-free nitrogen-containing glyoxal resin;
(C) a metal salt catalyst; and optionally
(D) a higher alcohol sulfuric acid ester-based surfactant.

Nonwoven fabrics and impregnated papers using the binder composition are also disclosed. The binder composition exhibits not only high resistance to water and solvents but also low residual free formaldehyde level, with an improvement in foamability being optionally attainable.

11 Claims, No Drawings

BINDER COMPOSITION AND NONWOVEN FABRICS AND IMPREGNATED PAPERS USING THE SAME

FIELD OF THE INVENTION

The present invention relates to a binder composition, as well as nonwoven fabrics and impregnated papers using the same. More particularly, the present invention relates to an improved binder composition containing vinyl acetate and ethylene as its main components. The present invention also relates to nonwoven fabrics and impregnated papers employing said binder composition in either an unfoamed or foamed state.

BACKGROUND OF THE INVENTION

Binders prepared by emulsion copolymerization of vinyl acetate and ethylene in the presence of a crosslinking agent selected from among N-methylol and N-alkoxy compounds, as well as products employing such binders are known. French Pat. No. 1,564,100 teaches efforts directed to increasing the solvent resistance and improving the enhanced mechanical stability of a film prepared from a vinyl acetate/ethylene copolymer emulsion. The efforts comprise using an N-methylol compound (e.g. N-methylolacrylamide or N-methylolmethacrylamide) or an N-alkoxy compound (e.g. a methyl or butyl ether of said N-methylol compound) as a cross-linking agent in an amount ranging from 0.5 to 10 wt % of vinyl acetate, and subjecting the copolymer to cross-linking at temperatures between room temperature and 180° C., preferably in the presence of a curbing agent. U.S. Pat. Nos. 3,345,318 and 3,380,851 describe the emulsion polymerization of a vinyl acetate/ethylene/N-methylolacrylamide copolymer and state that the resulting emulsion is useful as a binder in nonwoven fabrics and paper products having high resistance to water and solvents.

As shown in Japanese Patent Application (OPI) No. 55709/1977 (the term "OPI" as used herein means an unexamined published Japanese patent application), nonwoven fabrics and impregnated papers employing the aforementioned emulsion as a binder exhibit high resistance to water and solvents and yet retain the inherent properties of the vinyl acetate/ethylene copolymer, such as high resistance to light and heat and good embossability. Because of these advantages, the nonwoven fabrics and impregnated papers employing the emulsion as a binder are replacing increasingly those products which use such synthetic rubber latices as conventional styrene/butadiene copolymers, acrylonitrile/butadiene copolymers or methyl acrylate/butadiene copolymers as binders and which have low resistance to heat and light, as well those which employ acrylic copolymer emulsions as binders and which exhibit only poor heat resistance and embossability.

Nonwoven fabrics have many advantages over woven fabrics, such as low manufacturing cost, fray resistance and the capability of being provided with even higher degrees of water absorbency, porosity and resiliency. Because of these advantages, nonwoven fabrics find much utility in many end uses such as towels, diapers, wiping cloths, sheets, sanitary napkins, masks, gowns and covering spreads for use in hospitals, disposable wet towels, tableclothes, aprons, interlinings, and filters for civil-engineering purposes.

While nonwoven fabrics may be fabricated by a variety of techniques such as adhesive bonding, needle punching, spunlacing, stitch bonding and spunbonding, the present invention is primarily directed to the adhesive bonding type. This type of nonwoven fabric is manufactured by first preparing a web of loosely bound filaments and then giving them integrity with the aid of a binder which is deposited on the web by impregnation, printing, spraying or any other appropriate method. The so treated web is subsequently dried. The filaments may be made of such fibers as natural cellulosics, polyesters, polyamides, polyacrylics, rayons, wool, jute, and mixtures thereof. The filaments are loosely bound to a web form by known techniques such as carding, garnetting, air-laying, and papermaking processes.

The binder which is deposited on the web by impregnation, printing, spraying or any other suitable method is employed with a medium which is made of either water alone or the combination of water and air. The second type of medium is used when a conventional binder composition in emulsion is deposited after being foamed (this deposition technique is hereinafter referred to as the foam deposition process). In order to allow a given solids content of binder to be deposited over a large area, the binder must be diluted with water if the medium is solely made of water. On the other hand, there is no need to dilute the binder with water if the medium is made of both water and air because the volume of the binder can be increased by foaming. Therefore, the foam deposition process has the advantage of providing a higher solids content of binder. Since less water needs to be evaporated in the drying step, a significant cost reduction is realized with respect to the energy for drying. The low water evaporation offers another advantage in that minimum "migration" (i.e., the solid matter in emulsion accompanies the evaporating water and is carried to the surface) which affords increased strength for the adherend. Because of these advantages, the foam deposition process is gaining increasing attention of the textile industry.

As described above, a certain improvement in resistance to water and solvents can be attained by copolymerizing vinyl acetate with ethylene in the presence of a cross-linking agent selected from among N-methylol compounds such as N-methylolacrylamide and N-methylolmethacrylamide, and N-alkoxy compounds thereof. However, in many end uses even better resistance to water and solvents is desired. Finished nonwoven fabrics and impregnated papers manufactured today will not emit the malodor of formaldehyde but they contain a detectable amount of toxic formaldehyde and may present a health hazard if they are used in applications where they make direct contact with the skin.

It is therefore desired to further reduce the formaldehyde content in nonwoven fabrics and impregnated papers (the residual free formaldehyde is hereinafter abbreviated as FF) while satisfying the requirement for higher resistance to water and solvents. In order to increase the resistance to water and solvents, the density of crosslinking in the binder must be first increased and this requires that the content of a monomer such as N-methylol or N-alkoxy compound which is involved in crosslinking should be increased. However, as the contents of these monomers increase, the FF level increases inevitably, and it is impossible to meet the two requirements (i.e., higher resistance to water and solvents, and lower FF) simultaneously by conventional techniques. These heretofore incompatible demands can be met by the binder composition of the present invention. In addition, the more foamed the binder composition is in the foam deposition process, the larger the volume of the binder and the smaller the solids content of binder that is necessary for attaining uniform deposition of the binder over a given area. In other words, the loading of a solid matter in the binder can be increased by allowing it to be foamed to a greater extent. It has therefore been desired to realize a maximum degree of foaming in addition to the provision of higher resistance to water and solvents and lower FF. This objective has been unattainable by any prior art techniques but can be achieved by the binder of the present invention if it is foamed to a great extent.

SUMMARY OF THE INVENTION

The present invention relates to a binder composition which comprises:

(A) a copolymer emulsion which contains as its essential ingredients vinyl acetate, ethylene, and a monomer represented by the formula (1):

(1)

wherein $R_1$ is H or $CH_3$; and $R_2$ is H or an alkyl group having not more than 5 carbon atoms, the proportions of the respective ingredients being within the range of 55–96.5/3–40/0.5–5 on a weight basis;

(B) a formaldehyde-free nitrogen-containing glyoxal resin;

(C) a metal salt catalyst; and optionally (D) a higher alcohol sulfuric acid ester-based surfactant.

The binder composition of the present invention which contains (A), (B) and (C) as its essential components and which optionally contains (D) attains the following three advantages simultaneously: higher resistance to water and solvents is provided in the product incorporating said binder; the same product has a lower level of FF; and the binder can be formed to a great extent.

DETAILED DESCRIPTION OF THE INVENTION

1. Copolymer emulsion (A)

Examples of the monomer represented by the formula (1) include N-methylol(meth)acrylamide (signifying both N-methylolacrylamide and N-methylolmethacrylamide as is applicable to the following description), N-methoxymethyl(meth)acrylamide, N-ethoxymethyl(meth)acrylamide, and N-butoxymethyl(meth)acrylamide. The monomers of formula (1) need not be used independently and may be mixtures of two or more monomers.

The amount of the compound of formula (1) to be copolymerized is limited to be within the range of 0.5 to 5 parts by weight based on 100 parts by weight of the copolymer consisting of the foregoing three ingredients (hereinafter the same) for the purpose of imparting adequate resistance to water and solvents depending on the performance required of the final products such as nonwoven fabrics and impregnated papers incorporating the binder of the present invention. If the amount of the compound of formula (1) is less than 0.5 part by weight, it will not attain the intended cross-linking effect. On the other hand, the performance of the final product will not be increased by copolymerizing more than 5 parts by weight of the compound of formula (1).

The amount of ethylene to be copolymerized is limited to be within the range of 3 to 40 parts by weight for the following reasons: this range of ethylene content is sufficient to provide a varying degree of drape/hand (from hard to soft) depending on the performance required of the final products such as nonwoven fabrics and impregnated papers incorporating the binder of the present invention; ethylene having an amount of at least 3 parts by weight must be copolymerized in order to provide satisfactory water resistance; and a product having a softer hand cannot be obtained by copolymerizing more than 40 parts by weight of ethylene.

The copolymer emulsion (A) need not be solely composed of vinyl acetate, ethylene and the monomer of formula (1) and it may contain other appropriate copolymerizable monomers selected from: (meth)acrylic acid esters such as methyl (meth)acrylate, butyl (meth)acrylate, octyl (meth)acrylate and glycidyl (meth)acrylate; unsaturated acids such as acrylic acid, itaconic acid and maleic acid; (meth)acrylamide; vinylsulfonic acid (or salts thereof); 2-hydroxyethyl (meth)acrylamide; vinyl chloride, vinylidene chloride; styrene; butadiene; acrylonitrile; diallyl esters of maleic acid, adipic acid, phthalic acid, etc.; triallyl benzenetricarboxylate; and triallyl isocyanurate. There is no particular limitation on the method for preparing the copolymer emulsion (A). Illustrative emulsifiers include: completely or partially saponified poly(vinyl alcohol); cellulosic derivatives such as methyl cellulose and hydroxyethyl cellulose; nonionic or anionic water-soluble high-molecular weight compounds such as ammonium salts of $\alpha$-olefin/maleic anhydride copolymers; nonionic surfactants such as polyoxyethylene alkyl ethers, polyoxyethylene alkylphenyl ethers, polyoxyethylene/polyoxypropylene block copolymers and polyoxyethylene sorbitan fatty acid esters; and anionic surfactants such as sodium lauryl sulfate, dialkyl succinates, and alkylbenzenesulfonates. These emulsifiers may be used either independently or in admixture. A desirable polymerization initiator is one of the redox type. Illustrative oxidizing agents include ammonium persulfate, potassium persulfate, sodium persulfate, hydrogen peroxide, and a variety of organic peroxides. Persulfates are used with particular advantage since they also serve as crosslinking agents either themselves or in the form of their decomposition products. Illustrative reducing agents include formaldehyde sodium sulfoxylate, and reaction products between glyoxal and reductive sulfur oxides. Additives such as pH modifiers and electrolytes may also be used in accordance with known techniques of emulsion polymerization. Although polymerization conditions such as pressure and temperature are not limited to any particular values, it suits for practical purposes to maintain the temperature within the range of 0° to 100° C., preferably between 30° and 80° C. The polymerization pressure may be properly adjusted depending upon the ethylene content of the intended copolymer, and a pressure of 5 to 100 kg/cm² may be employed in order to obtain a copolymer containing ethylene in an amount of 3 to 40 parts by weight. The solids content of the emulsion may be adjusted by controlling the amount of water and the contents of the monomers to be copolymerized, and a solids content of the order of 40 to 60 wt % is appropriate for industrial purposes.

2. Formaldehyde-free nitrogen-containing glyoxal resin (B)

Examples of the formaldehyde-free nitrogen-containing glyoxal resin (B) include: reaction products between glyoxal and urea, N-monomethylurea or N,N'-dimethylurea containing 4,5-dihydroxy-2-imidazolidinone, 1-methyl-4,5-dihydroxy-2-imidazolidinone or 1,3-dimethyl-4,5-dihydroxy-2-imidazolidinone; reaction products between glyoxal and ethyleneurea, propyleneurea, urones, 4,5-dihydroxy-2-imidazolidinone, tetrahydro-5-(2-hydroxyethyl)-1, 3,5-triazin-2-one, or 5-methyl-2-pyrimidinone, as well as alkylated or polyhydric alcohol modified products thereof; and reaction products between glyoxal and compounds having an amide structure such as 1,3-bis(2-hydroxyethyl)-4,5-dihydroxy-2-imidazolidinone, formamide, N-methylformamide, acetamide, methylenebisformamide, ethylenebisformamide, methyl carbamate, isopropyl carbamate, hydroxyethyl carbamate, acrylamide and pyrrolidone, as well as alkylated or polyhydric alcohol modified products thereof. The above-listed glyoxal resins are known by the generic name "non-formaldehyde cross-linking agents" in the field of textile finishing resins. A preferable and most practical glyoxal resin is one which contains 1,3-dimethyl-4,5-dihydroxy-2-imidazolidinone as the main component.

3. Metal salt catalyst (C)

The metal salt catalyst (C) may be selected from among those metal salt catalysts which are being used or recommended to be used in textile finishing processes such as anti-wrinkle and non-shrink treatments, permanent-press finishing and wash-and-wear finishing. Examples of such metal salt catalysts include magnesium salts such as magnesium chloride and magnesium nitrate; aluminum salts such as aluminum sulfate and aluminum chloride; zinc salts such as zinc nitrate, zinc sulfate and zinc fluoroborate; tin salts such as stannic chloride; and zirconium salts such as zirconium hydroxychloride. A variety of these metal salt catalysts may be used to comply with the requirements of a broad range of applications but magnesium chloride is commonly used because it attains a balance between various properties (e.g. low staining of cellulosic fibers, high cross-linking catalyzing effect, and high degree of safety). Therefore, magnesium chloride is most suitable for use as a metal salt catalyst in practical applications. Needless to say, two or more of the metal salt catalysts listed above may be used in combination in order to satisfy a broad range of requirements for utility. In addition to the combined use of metal salt catalysts, the use of metal salt catalysts together with Bronsted acids, which may be inorganic or organic, is well known as the technique of forming a hot catalyst or activated catalyst system, which is of course included within the category of the "metal salt catalyst" used in the present invention. However, the copolymer emulsion (A) usually contains Bronsted acids which are derived from various sources such as polymerization initiators (e.g. persulfates, organic peroxides, formaldehyde sodium sulfoxylate, or reaction products between glyoxal and reductive sulfur oxides), emulsifiers (e.g. sodium lauryl sulfate and alkylbenzenesulfonates), pH modifiers, and copolymerizable monomers (e.g. acrylic acid and maleic acid), and it should be noted that if the copolymer emulsion contains the necessary amount of Bronsted acids, a hot catalyst system need not be prepared by further adding a Bronsted acid to the metal salt catalyst. Bronsted acids that may be used to make hot catalyst systems are illustrated by, but are in no sense limited to, citric acid, maleic acid, methanesulfonic acid, phosphoric acid, primary ammonium phosphate, sulfuric acid, hydrochloric acid, and aluminum dichlorohydroxide.

The proportions of the copolymer emulsion (A), glyoxal resin (B) and the metal salt catalyst (C) are not limited to any particular values but, preferably, they are within the range of 100/1–10/0.05–4 (A/B/C) on a solids content weight basis. If less than one part by weight of (B) is used per 100 parts by weight of (A), the objectives of the present invention will not be attained. If, on the other hand, more than 10 parts by weight of (B) is used per 100 parts by weight of (A), the effects of increasing the resistance to water and solvents while reducing the FF level are saturated and the result is a mere waste of the glyoxal resin (B).

The same will apply to the component (C). If less than 0.05 part by weight of (C) is used per 100 parts by weight of (A), the objectives of the present invention will not be attained, and if more than 4 parts by weight of (C) is used per 100 parts by weight of (A), the effects of increasing the resistance to water and solvents while reducing the FF level are eight saturated or decreased.

4. Higher alcohol sulfuric acid ester-based surfactant (D)

The higher alcohol sulfuric acid ester-based surfactant which may optionally be used as component (D) is represented by the following formula (2):

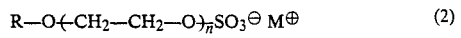

$$R-O+CH_2-CH_2-O)_{\overline{n}}SO_3^{\ominus} M^{\oplus} \qquad (2)$$

wherein R is an alkyl group having 8 or more carbon atoms; n is an integer of 0 to 10; and M is a monovalent cation which is not limited to any particular species.

Surfactants are roughly divided into four groups: anionic, cationic, amphoteric and nonionic. Cationic surfactants such as quaternary ammonium salts and alkylpyridinium salts are unsuitable for use as foaming agents in the present invention because if they are added to the emulsion (A) and mixed, the emulsion particles will agglomerate to form grits or, in an extreme case, the entire portion of the binder composition may gel. These undesirable phenomena will occur probably because the emulsion particles are generally charged negatively irrespective of whether an anionic or nonionic emulsifier is incorporated in the emulsion. Amphoteric surfactants such as betaines and amine oxides provide better foamability for the binder composition but experimental results show that finished products employing said binder have considerably low levels of resistance to water and solvents. Therefore, amphoteric surfactants are not suitable for attaining the objects of the present invention.

Nonionic surfactants such as polyoxyethylene alkyl ethers, polyoxyethylene alkylphenol ethers, polyoxyethylene alkyl esters, sorbitan alkyl esters, and polyoxyethylene sorbitan alkyl esters are free from the disadvantage of damaging the resistance to water and solvents in the finished products, but they have been found to cause insufficient foaming in the binder composition.

Anionic surfactants are divided into many types by the polar group, such as carboxylates, sulfuric acid ester salts, sulfonates and phosphoric acid ester salts. The present inventors conducted many studies on the anionic surfactants known today and found that specified surfactants represented by the formula (2) have good foaming properties, provide resistance to water and solvents in the finished product, and reduce its FF level. Some sulfonate salts exhibited good foaming properties in the absence of the metal salt catalyst (C) but only poor foaming occurred when such a metal salt catalyst was used. Finished products incorporating sulfonate salt-based surfactants had high FF levels and exhibited lower level of resistance to water and solvents than those employing the surfactant (D). Carboxylates and phosphoric acid ester salts also caused poor foaming of the binder composition.

Further details of the surfactant (D) are given below. The alkyl group signified by R in formula (2) should have at least 8 carbon atoms in order to attain satisfactory foaming properties; n which is an integer of 0 and upward should not be greater than 10 in order to ensure satisfactory foaming properties; M may be any monovalent cation which is illustrated by sodium, potassium, ammonium, and triethanol ammonium ions, these ions being equivalent to each other in terms of the foaming property. Ammonium and triethanol ammonium ions are generally superior in terms of foam stability but should sometimes be avoided if the specified end use dislikes malodorous or stained products. In short, the appropriate surfactant (D) may be selected in accordance with the specific requirements for the final end use so long as it is a monovalent cation. Considerations of price and general availability in the industry dictate the use of sodium ions as standard monovalent cations. Divalent cations are undesirable because of their low foaming ability.

The proportions of the copolymer emulsion (A) and the higher alcohol sulfuric acid ester-based surfactant (D) are not limited to any particular values but, advantageously, they are within the range of 100/2–10 (A/D) on a solids content weight basis. If the proportion of the surfactant (D) is too small, insufficient foaming occurs. Using too much surfactant (D) is also undesirable because the foamability of the binder composition is saturated and the finished product will simply contain an unnecessarily large amount of the surfactant. The higher alcohol sulfuric acid ester-based surfactant (D) need not be a single compound. Two or more compounds may of course be used if they meet the aforementioned requirements for the higher alcohol sulfuric acid ester-based surfactant. The higher alcohol sulfuric acid ester-based surfactant may also be used in combination with other surfactants which are not a higher alcohol sulfuric acid ester-based surfactant. However, such other surfactants should preferably be used in amounts on a solids weight basis which are not greater than that of the higher alcohol sulfuric acid ester-based surfactant; this is necessary in order to attain the objectives of the present invention simultaneously—final products having increased resistance to water and solvents and low FF level, and a binder composition having high foamability.

While the four components of the binder composition of the present invention, copolymer emulsion (A), glyoxal resin (B), metal salt catalyst (C) and higher alcohol sulfuric acid ester-based surfactant (D), have been described above, the binder composition may optionally contain known additives such as foam stabilizers, fillers, dispersion stabilizers, wetting agents and thickening agents. It is also within the scope of the present invention to employ known emulsions and latices together with the copolymer emulsion (A).

Nonwoven fabrics may be prepared by the following procedures using the binder composition of the present invention: an unbonded or preliminarily bonded web is first prepared by wet or dry forming processes; the web then is impregnated with the binder or, alternatively, the binder is deposited on the web by either spraying, printing or any other appropriate methods; the so treated web is subsequently dried and subjected to an appropriate heat treatment. If the foam deposition process is used, the following procedures may be employed: an unbonded or preliminarily bonded web is first prepared by wet or dry forming processes; the binder composition, after being foamed, is placed in contact with the web and air is sucked from below the web or, alternatively, the binder is caused to penetrate to the interior of the nonwoven fabric by pushing the foam thereinto under pressure or with the aid of a plunger in the form of either a plate or rod; the resulting fabric is dried and subjected to an appropriate heat treatment. The foam particles which have entered into the nonwoven fabric will be broken to wet the fabric. These operations may be performed by any known foaming methods, foam deposition processes, drying techniques, and heat treatment methods. The equipment which may be employed to implement these methods is also known and may be used without any limitation or modification.

Impregnated papers may be prepared by impregnating base papers with the binder composition of the present invention on any conventional impregnating machine, followed by drying and heat treatment which are conducted under routine conditions. The method for fabricating impregnated papers in accordance with the present invention is in no way limited except for the composition of the binder. In order to have the effect of crosslinking reaction, a heat treatment may be performed at 100° to 180° C., preferably 120° to 150° C. for a period ranging from 1 to 20 minutes.

The fabrication procedures described above enable the manufacture of nonwoven fabrics and impregnated papers which have low FF level while exhibiting high degrees of resistance to water and solvents.

The binder composition of the present invention may also be used in the field of finishing woven fabrics by applying the binder to such agents as drape/hand modifiers, gumming agents, dimensional stabilizers for knitted fabrics, water-proofing agents or printing binders. The woven fabrics finished by these agents have commercial value comparable to that of the nonwoven fabrics manufactured by using the binder composition of the present invention.

The present invention is described in more detail with reference to the following referential examples and working examples, which are given here for no purposes other than illustrating the invention.

REFERENTIAL EXAMPLE 1

Preparation of a Copolymer Emulsion

An autoclave (100) equipped with a thermostat and a stirrer was charged with the following.

| Component | Grams |
|---|---|
| Water | 32,000 |
| Hydroxyethyl cellulose having 2.5 moles of ethylene oxide added thereto | 365 |
| Polyoxyethylene nonylphenol ether | 800 |

| Component | Grams |
|---|---|
| (HLB: 17) Polyoxyethylene nonylphenol ether (HLB: 14) | 800 |

The charge was heated for one hour under stirring until a complete solution formed. After cooling the charge to about 30° C., the following were added:

| Component | Grams |
|---|---|
| Vinyl acetate | 8,250 |
| Acetic acid | 16 |
| Sodium acetate | 20 |

Oxygen was removed from the reactor by purging the reactor with nitrogen and ethylene. Then, the charge was heated to 45° C. while ethylene was introduced to maintain the pressure in the reactor at 60 kg/cm². An 8% aqueous solution of ammonium persulfate was added and when polymerization started to occur, supply of the following two substances was initiated. The first substance was vinyl acetate (20,000 g) which was supplied over 4 hours at a constant rate. The second substance was N-methlolacrylamide (550 g) dissolved in 2,000 g of water, which was supplied over 5 hours at a constant rate. Throughout the addition of these two substances, the pressure of ethylene in the reactor was held at 60 kg/cm². In 9.5 hours of polymerization, the content of unreacted vinyl acetate monomer fell to 0.32%, at which point the polymerization was quenched. The resulting emulsion had a solids contents of 50 wt %, with the contents of ethylene and N-methylolacrylamide as calculated from material balance being 25 wt % and 1.3 wt %, respectively. The emulsion obtained is referred to as emulsion (A).

REFERENTIAL EXAMPLE 2

Preparation of Copolymer Emulsion

The procedures of Referential Example 1 were repeated except that the glyoxal sodium bisulfite was replaced by an equimolar amount of formaldehyde sodium sulfoxylate. The resulting emulsion had a solids content of 50 wt %, with the contents of ethylene and N-methylolacrylamide as calculated from material balance being 25 wt % and 1.3 wt %, respectively. The emulsion obtained is referred to as emulsion (B).

REFERENTIAL EXAMPLE 3

Preparation of Copolymer Emulsion

The procedures of Referential Example 1 were repeated except that the amount of N-methylolacrylamide was decreased to 410 g, 20,000 g of vinyl acetate to be supplied after initiation of the polymerization was supplied after 820 g of N-n-butoxymethylacrylamide was added thereto and dissolved therein, and that the pressure of ethylene in the reactor was held at 45 kg/cm². The resulting emulsion had a solids content of 50 wt %, with the contents of ethylene, N-methylolacrylamide and N-n-butoxymethylacrylamide as calculated from material balance being 17 wt %, 1.0 wt % and 2.0 wt %, respectively. The emulsion obtained is referred to as emulsion (C).

REFERENTIAL EXAMPLE 4

Preparation of Copolymer Emulsion The procedures of Referential Example 2 were repeated except that 2,825 g of 20,000 g of the vinyl acetate to be supplied after initiation of the polymerization was replaced by 2-ethylhexyl acrylate. The resulting emulsion had a solids content of 50 wt %, with the contents of ethylene, N-methylolacrylamide and 2-ethylhexyl acrylate as calculated from material balance being 25 wt %, 1.3 wt % and 7 wt %, respectively. The emulsion obtained is referred to as emulsion (D).

REFERENTIAL EXAMPLE 5

Preparation of Nitrogen-Containing Glyoxal Resin

Two hundred and ninety parts (2 moles) of a 40% aqueous solution of glyoxal was adjusted to a pH of 6.5 with sodium carbonate. After addition of 176 parts (2 moles) of ethyleneurea, the mixture was heated to 50°±5° C. The mixture was stirred for about 2 hours at that temperature while its pH was held between 6 and 7. Two hours later, 200 parts (6.25 moles) of methanol was added and the pH of the mixture was adjusted to about 3.0 with concentrated sulfuric acid. Methylation was completed by refluxing for 3 hours. Thereafter, the resin solution was cooled to 30° C., the pH was adjusted to about 7.0 by addition of a 25% aqueous solution of sodium hydroxide, and the solids content was adjusted to 50% by dilution with a small amount of water. The resulting glyoxal resin is referred to as resin (X).

REFERENTIAL EXAMPLE 6

Preparation of Nitrogen-Containing Glyoxal Resin

Three hundred and sixty-three parts (2.5 moles) of a 40% aqueous solution of glyoxal was adjusted to a substantially neutral pH by addition of a 25% aqueous solution of sodium hydroxide. After addition of 242 parts (2.75 moles) of dimethylurea, the mixture was heated to 50°±5° C. The mixture was stirred for about 20 hours at that temperature while its pH was held between 6 and 7. Thereafter, the mixture was cooled to 30° C., its pH adjusted to about 5 with sulfuric acid, and the solids content was adjusted to 40% by dilution with water. The resulting glyoxal resin is referred to as resin (Y).

EXAMPLES 1 TO 21 AND COMPARATIVE EXAMPLES 1 TO 29

Using emulsions (A) to (D) and glyoxal resin (X) and (Y) prepared in Referential Examples 1 to 6, as well as cross-linking catalysts (i.e., magnesium chloride and zinc nitrate) and the surfactants shown below, formulations having the solids content ratios shown in Table 1 were prepared. They were then adjusted with water to make binder compositions each having a solids content of 12 wt %. The binder compositions thus prepared were foamed to the ultimate extent on a foaming machine (e.g. MINIMIX, a trade name of Werner Mathis AG, Switzerland) consisting of a constant air feeder, a constant binder feeder and a mixing head. The foamed binders were placed on 100% rayon nonwoven webs and air was sucked from below the webs under a reduced pressure such that the froth was impregnated in the rayon web until the solids content of each binder composition was 18 wt %. The webs were then dried at 130° C. for 1.5 minutes and heat-treated at 130° C. for 10 minutes to prepare nonwoven fabrics having a basis weight of 45 g/m². The properties of the nonwoven fabrics were tested under the conditions shown below and are summarized in Table 1. The three tensile strength values were measured by the methods described in JIS L-1085 "Methods of Testing Nonwoven Fabric Interlining".

(1) Dry tensile strength: measured under normal conditions (20° C.×65% r.h.)

(2) Water resistance: measured in terms of tensile strength after immersion in water at 20° C. for 30 minutes.

(3) Solvent resistance: measured in terms of tensile strength after immersion in methyl ethyl ketone or gasoline at 20° C. for 30 minutes.

(4) FF: The amount of free formaldehyde in the nonwoven fabric was measured in accordance with JIS L-1041 and L-1096 (the acetyl acetone method with 2.5 g of the sample).

(5) Maximum foam ratio: Maximum foam ratio as attainable with MINIMIX at a solution temperature of 20° C. was calculated by the following equation:

$$\text{Foam ratio} = \frac{\text{volume of foamed binder (cm}^3\text{)}}{\text{weight of foamed binder (g)}}$$

The methods of measurement were common to all examples and comparative examples. As Table 1 listing the properties of the nonwoven fabrics and the foamability of the binder compositions shows, the copolymer emulsions which were combined with the formaldehyde-free nitrogen-containing glyoxal resins, metal salt catalysts and higher alcohol sulfuric acid ester-based surfactants specified in the present invention exhibited superior performance in terms of the resistance to water and solvents, FF and foamability.

Surfactants used:
(a) Sodium lauryl sulfate:
$C_{12}H_{25}OSO_3Na$
(b) Ammonium lauryl sulfate:
$C_{12}H_{25}OSO_3NH_4$
(c) Polyoxyethylene lauryl ether sulfuric acid sodium salt:
$C_{12}H_{25}O(CH_2CH_2O)_nSO_3Na$     n = 3

(d) Sodium deoctylsulfosuccinate:

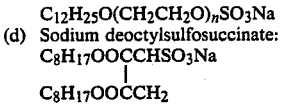

(e) Disodium salt of N—alkylsulfosuccinic acid monoamide
(Perex TA, a trade name of Kao Soap Co., Ltd.):

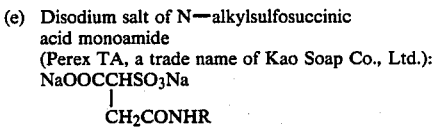

(f) Sodium dodecylbenzenesulfonate:

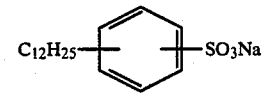

(g) Polyoxyethylene nonylphenol ether sulfuric acid sodium salt:

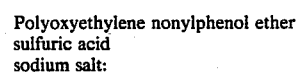
    n = 4

(h) Polyoxyethylene lauryl ether:
$C_{12}H_{25}O(CH_2CH_2O)_nH$     n = 6
(i) Polyoxyethylene nonylphenol ether:     n = 5

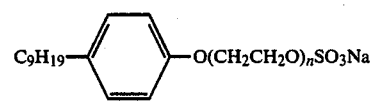

(j) Dimethyllaurylamine oxide:

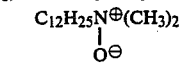

(k) Dimethyllaurylammonium acetate (laurylbetaine):

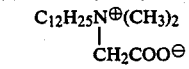

TABLE 1

| Example No. | Copolymer Emulsion | Glyoxal Resin | Cross-Linking Catalyst | Surfactant | Formulation Ratio (Solids weight basis) |
|---|---|---|---|---|---|
| Example | | | | | |
| 1 | A | X | MgCl$_2$ | a | 100/5/1.0/2.9 |
| 2 | A | Y | MgCl$_2$ | a | 100/5/1.0/2.9 |
| 3 | A | Y | MgCl$_2$ | c | 100/5/1.0/2.9 |
| 4 | B | Y | MgCl$_2$ | a | 100/5/1.0/2.9 |
| 5 | C | X | MgCl$_2$ | a | 100/5/1.0/2.9 |
| 6 | C | Y | MgCl$_2$ | a | 100/2.5/0.5/2.9 |
| 7 | C | Y | MgCl$_2$ | a | 100/2.5/1.0/2.9 |
| 8 | C | Y | MgCl$_2$ | a | 100/5/0.1/2.9 |
| 9 | C | Y | MgCl$_2$ | a | 100/5/0.25/2.9 |
| 10 | C | Y | MgCl$_2$ | a | 100/5/0.5/2.9 |
| 11 | C | Y | MgCl$_2$ | a | 100/5/0.5/5.8 |
| 12 | C | Y | MgCl$_2$ | a | 100/5/0.5/8.7 |
| 13 | C | Y | MgCl$_2$ | b | 100/5/0.5/2.9 |
| 14 | C | Y | MgCl$_2$ | c | 100/5/0.5/2.9 |
| 15 | C | Y | Zn(NO$_3$)$_2$ | c | 100/5/0.35/2.9 |
| 16 | C | Y | MgCl$_2$ | a$^{46}$ + d$^{17}$ | 100/5/0.5/4.6 + 1.7 |
| 17 | C | Y | MgCl$_2$ | a | 100/5/1.0/2.9 |
| 18 | C | Y | MgCl$_2$ | a | 100/10/1.0/2.9 |
| 19 | C | Y | MgCl$_2$/ citric acid = 5/1 | a | 100/5/1.0/2.9 |
| 20 | D | Y | MgCl$_2$ | a | 100/5/1.0/2.9 |
| 21 | D | Y | MgCl$_2$ | a | 100/5/3.5/2.9 |

TABLE 1-continued

| Comparative Example | | | | | |
|---|---|---|---|---|---|
| 1 | A | — | — | a | 100/—/—/2.9 |
| 2 | A | X | — | a | 100/5/—/2.9 |
| 3 | A | Y | — | a | 100/5/—/2.9 |
| 4 | A | — | MgCl$_2$ | a | 100/—/1.0/2.9 |
| 5 | B | — | — | a | 100/—/—/2.9 |
| 6 | B | X | — | a | 100/5/—/2.9 |
| 7 | B | Y | — | a | 100/5/—/2.9 |
| 8 | B | — | MgCl$_2$ | a | 100/—/1.0/2.9 |
| 9 | C | — | — | a | 100/—/—/2.9 |
| 10 | C | X | — | a | 100/5/—/2.9 |
| 11 | C | Y | — | a | 100/2.5/—/2.9 |
| 12 | C | Y | — | a | 100/5/—/2.9 |
| 13 | C | Y | — | a | 100/10/—/2.9 |
| 14 | C | — | MgCl$_2$ | a | 100/—/0.25/2.9 |
| 15 | C | — | MgCl$_2$ | a | 100/—/0.5/2.9 |
| 16 | C | — | MgCl$_2$ | a | 100/—/1.0/2.9 |
| 17 | C | — | MgCl$_2$ | a | 100/—/2.5/2.9 |
| 18 | D | — | — | a | 100/—/—/2.9 |
| 19 | D | Y | — | a | 100/5/—/2.9 |
| 20 | D | — | MgCl$_2$ | a | 100/—/3.5/2.9 |
| 21 | C | Y | MgCl$_2$ | d | 100/5/0.5/2.9 |
| 22 | C | Y | MgCl$_2$ | e | 100/5/0.5/2.9 |
| 23 | C | Y | MgCl$_2$ | f | 100/5/0.5/2.9 |
| 24 | C | Y | Zn(NO$_3$)$_2$ | f | 100/5/0.5/2.9 |
| 25 | C | Y | MgCl$_2$ | g | 100/5/0.5/2.9 |
| 26 | C | Y | MgCl$_2$ | h | 100/5/0.5/4.4 |
| 27 | C | Y | MgCl$_2$ | i | 100/5/0.5/4.4 |
| 28 | C | Y | MgCl$_2$ | j | 100/5/0.5/2.9 |
| 29 | C | Y | MgCl$_2$ | k | 100/5/0.5/2.9 |

| Example No. | Dry Tensile Strength (kg/5 cm) | Resistance to Water (kg/5 cm) | Resistance to Solvent (MEK) (kg/5 cm) | Resistance to Solvent (Gasoline) (kg/5 cm) | FF (ppm) | Maximum Foam Ratio |
|---|---|---|---|---|---|---|
| Example | | | | | | |
| 1 | 2.43 | 1.85 | 1.27 | 1.57 | 7 | 18.8 |
| 2 | 2.52 | 1.98 | 1.21 | 1.66 | 4 | 18.9 |
| 3 | 2.49 | 1.92 | 1.25 | 1.71 | 5 | 19.5 |
| 4 | 2.55 | 1.96 | 1.23 | 1.63 | 7 | 18.5 |
| 5 | 2.73 | 1.95 | 1.39 | 1.67 | 7 | 18.9 |
| 6 | 2.84 | 1.97 | 1.33 | 1.70 | 6 | 18.5 |
| 7 | 2.79 | 2.01 | 1.30 | 1.72 | 5 | 18.7 |
| 8 | 2.77 | 1.95 | 1.32 | 1.68 | 5 | 18.2 |
| 9 | 2.84 | 2.02 | 1.36 | 1.72 | 5 | 18.5 |
| 10 | 2.87 | 2.15 | 1.41 | 1.83 | 4 | 18.7 |
| 11 | 2.80 | 2.25 | 1.43 | 1.85 | 3 | 23.7 |
| 12 | 2.90 | 2.31 | 1.42 | 1.84 | 2 | 25.9 |
| 13 | 2.87 | 2.25 | 1.54 | 2.01 | 4 | 19.0 |
| 14 | 2.88 | 2.10 | 1.40 | 1.81 | 5 | 19.3 |
| 15 | 2.81 | 2.07 | 1.38 | 1.77 | 3 | 18.8 |
| 16 | 2.86 | 2.26 | 1.42 | 1.85 | 10 | 25.8 |
| 17 | 2.90 | 2.12 | 1.32 | 1.80 | 4 | 18.9 |
| 18 | 2.82 | 2.08 | 1.37 | 1.77 | 4 | 19.0 |
| 19 | 2.85 | 2.06 | 1.35 | 1.74 | 4 | 18.8 |
| 20 | 2.43 | 1.92 | 1.24 | 1.63 | 7 | 19.0 |
| 21 | 2.42 | 1.88 | 1.18 | 1.58 | 8 | 19.2 |
| Comparative Example | | | | | | |
| 1 | 2.16 | 1.18 | 0.83 | 1.01 | 14 | 18.3 |
| 2 | 2.25 | 1.27 | 0.90 | 1.06 | 13 | 18.5 |
| 3 | 2.21 | 1.35 | 0.94 | 1.15 | 11 | 18.5 |
| 4 | 2.20 | 1.31 | 0.90 | 1.06 | 15 | 18.9 |
| 5 | 2.19 | 1.14 | 0.80 | 0.97 | 20 | 18.1 |
| 6 | 2.28 | 1.25 | 0.87 | 1.07 | 19 | 18.3 |
| 7 | 2.20 | 1.30 | 0.91 | 1.12 | 17 | 18.4 |
| 8 | 2.19 | 1.28 | 0.88 | 1.04 | 21 | 18.6 |
| 9 | 2.55 | 1.35 | 0.99 | 1.14 | 13 | 18.2 |
| 10 | 2.64 | 1.40 | 1.01 | 1.16 | 13 | 18.3 |
| 11 | 2.61 | 1.44 | 0.97 | 1.19 | 12 | 18.3 |
| 12 | 2.55 | 1.48 | 1.07 | 1.25 | 11 | 18.4 |
| 13 | 2.49 | 1.45 | 1.06 | 1.25 | 10 | 18.5 |
| 14 | 2.63 | 1.39 | 1.05 | 1.10 | 13 | 18.6 |
| 15 | 2.71 | 1.50 | 1.04 | 1.16 | 13 | 18.7 |
| 16 | 2.56 | 1.46 | 1.02 | 1.13 | 14 | 18.8 |
| 17 | 2.48 | 1.38 | 0.80 | 1.04 | 14 | 18.9 |
| 18 | 2.08 | 1.11 | 0.84 | 0.96 | 21 | 18.4 |
| 19 | 2.14 | 1.28 | 0.93 | 1.13 | 19 | 18.7 |
| 20 | 2.12 | 1.26 | 0.78 | 1.00 | 20 | 19.0 |
| 21 | 2.84 | 2.12 | 1.40 | 1.83 | 16 | 15.4 |
| 22 | 2.80 | 2.10 | 1.39 | 1.82 | 5 | 10.3 |

TABLE 1-continued

| | | | | | | |
|---|---|---|---|---|---|---|
| 23 | 2.82 | 2.11 | 1.39 | 1.81 | 6 | 16.1 |
| 24 | 2.80 | 2.05 | 1.35 | 1.77 | 5 | 15.9 |
| 25 | 2.86 | 2.10 | 1.37 | 1.79 | 5 | 15.2 |
| 26 | 2.80 | 1.95 | 1.39 | 1.72 | 5 | 12.7 |
| 27 | 2.80 | 1.90 | 1.40 | 1.80 | 5 | 12.0 |
| 28 | 2.67 | 0.59 | 0.50 | 0.64 | 15 | 20.5 |
| 29 | 2.43 | 1.56 | 0.98 | 1.28 | 5 | 18.9 |

EXAMPLES 22 TO 35 AND COMPARATIVE EXAMPLES 30 TO 49

Using emulsions (A) to (D) and glyoxal resins (X) and (Y) prepared in Referential Examples 1 to 6, as well as a cross-linking agent (magnesium chloride), formulations having the solids content ratios shown in Table 2 were prepared. Nonwoven webs solely made of rayon were impregnated with these formulations to 30 wt % saturation. Thereafter, the webs were dried at 130° C. for 1.5 minutes and heat-treated at 130° C. for 10 minutes so as to prepare nonwoven fabrics each having a basis weight of 45 g/m$^2$. The properties of these nonwoven fabrics are shown in Table 2, from which one can see that the emulsions as combined with the formaldehyde-free nitrogen-containing glyoxal resin and the metal salt catalyst attained improvement not only in resistance to water and solvents but also in FF level.

TABLE 2

| | Binder Formulation | | | |
|---|---|---|---|---|
| Example No. | Co-polymer Emulsion | Glyoxal Resin | Cross-Linking Catalyst | Formulation Ratio (Solids weight basis) |
| Example | | | | |
| 22 | A | X | MgCl$_2$ | 100/5/1.0 |
| 23 | A | Y | MgCl$_2$ | 100/5/1.0 |
| 24 | B | Y | MgCl$_2$ | 100/5/1.0 |
| 25 | C | X | MgCl$_2$ | 100/5/1.0 |
| 26 | C | Y | MgCl$_2$ | 100/2.5/0.5 |
| 27 | C | Y | MgCl$_2$ | 100/2.5/1.0 |
| 28 | C | Y | MgCl$_2$ | 100/5/0.1 |
| 29 | C | Y | MgCl$_2$ | 100/5/0.25 |
| 30 | C | Y | MgCl$_2$ | 100/5/0.5 |
| 31 | C | Y | MgCl$_2$ | 100/5/1.0 |
| 32 | C | Y | MgCl$_2$ | 100/10/0.1 |
| 33 | C | Y | MgCl$_2$ citric acid = 5/1 | 100/5/1.0 |
| 34 | D | Y | MgCl$_2$ | 100/5/1.0 |
| 35 | D | Y | MgCl$_2$ | 100/5/3.5 |
| Comparative Example | | | | |
| 30 | A | — | — | 100/—/— |
| 31 | A | X | — | 100/5/— |
| 32 | A | Y | — | 100/5/— |
| 33 | A | — | MgCl$_2$ | 100/—/1.0 |
| 34 | B | — | — | 100/—/— |
| 35 | B | X | — | 100/5/— |
| 36 | B | Y | — | 100/5/— |
| 37 | B | — | MgCl$_2$ | 100/—/1.0 |
| 38 | C | — | — | 100/—/— |
| 39 | C | X | — | 100/5/— |
| 40 | C | Y | — | 100/2.5/— |
| 41 | C | Y | — | 100/5/— |
| 42 | C | Y | — | 100/10/— |
| 43 | C | — | MgCl$_2$ | 100/—/0.25 |
| 44 | C | — | MgCl$_2$ | 100/0/0.5 |
| 45 | C | — | MgCl$_2$ | 100/—/10 |
| 46 | C | — | MgCl$_2$ | 100/—/2.5 |
| 47 | D | — | — | 100/—/— |
| 48 | D | Y | — | 100/5/— |
| 49 | D | — | MgCl$_2$ | 100/—/3.5 |

| Example No. | Dry Tensile Strength (kg/5 cm) | Resistance to Water (kg/5 cm) | Resistance to Solvent (MEK) (kg/5 cm) | Resistance to Solvent (Gasoline) (kg/5 cm) | FF (ppm) |
|---|---|---|---|---|---|
| Example | | | | | |
| 22 | 2.70 | 1.87 | 1.30 | 1.69 | 11 |
| 23 | 2.80 | 2.00 | 1.23 | 1.79 | 7 |
| 24 | 2.83 | 1.98 | 1.25 | 1.75 | 12 |
| 25 | 3.03 | 1.97 | 1.43 | 1.80 | 11 |
| 26 | 3.16 | 1.99 | 1.37 | 1.83 | 10 |
| 27 | 3.10 | 2.03 | 1.33 | 1.85 | 9 |
| 28 | 3.08 | 1.97 | 1.35 | 1.81 | 8 |
| 29 | 3.15 | 2.04 | 1.40 | 1.85 | 8 |
| 30 | 3.19 | 2.17 | 1.45 | 1.98 | 7 |
| 31 | 3.22 | 2.14 | 1.36 | 1.94 | 7 |
| 32 | 3.13 | 2.10 | 1.41 | 1.91 | 7 |
| 33 | 3.17 | 2.08 | 1.39 | 1.88 | 7 |
| 34 | 2.70 | 1.94 | 1.27 | 1.75 | 12 |
| 35 | 2.69 | 1.90 | 1.20 | 1.70 | 13 |
| Comparative Example | | | | | |
| 30 | 2.40 | 1.20 | 0.86 | 1.07 | 23 |
| 31 | 2.50 | 1.29 | 0.93 | 0.13 | 22 |
| 32 | 2.45 | 1.37 | 0.96 | 1.23 | 19 |
| 33 | 2.44 | 1.33 | 0.92 | 1.13 | 25 |
| 34 | 2.43 | 1.16 | 0.83 | 1.03 | 33 |
| 35 | 2.53 | 1.27 | 0.90 | 1.14 | 32 |
| 36 | 2.44 | 1.32 | 0.93 | 1.19 | 29 |
| 37 | 2.43 | 1.30 | 0.90 | 1.10 | 35 |
| 38 | 2.83 | 1.32 | 1.00 | 1.21 | 22 |
| 39 | 2.93 | 1.42 | 1.05 | 1.24 | 21 |
| 40 | 2.90 | 1.46 | 0.99 | 1.27 | 20 |
| 41 | 2.83 | 1.50 | 1.10 | 1.34 | 19 |
| 42 | 2.77 | 1.47 | 1.09 | 1.34 | 17 |
| 43 | 2.92 | 1.41 | 1.07 | 1.17 | 22 |
| 44 | 3.00 | 1.52 | 1.08 | 1.24 | 21 |
| 45 | 2.84 | 1.48 | 1.04 | 1.20 | 23 |
| 46 | 2.76 | 1.40 | 0.83 | 1.11 | 24 |
| 47 | 2.31 | 1.13 | 0.87 | 1.02 | 35 |
| 48 | 2.38 | 1.30 | 0.97 | 1.20 | 31 |
| 49 | 2.36 | 1.28 | 0.80 | 1.06 | 34 |

EXAMPLES 36 TO 49 AND COMPARATIVE EXAMPLES 50 TO 69

Using emulsions (A) to (D) and glyoxal resins (X) and (Y) prepared in Referential Examples 1 to 6, as well as a cross-linking agent (magnesium chloride), formulations having the solids content ratios shown in Table 3 were prepared. The resistance to water and solvents and FF level of these formulations were evaluated after they were impregnated in filter paper (120 g/m$^2$) by the following procedures: the solids contents of the formulations were adjusted with water and impregnated in the filter paper to 20 wt % saturation; and the paper was dried with air and heat-treated at 130° C. for 10 minutes. The performance of each sample of impregnated paper is shown in Table 3, from which one can see that the emulsions as combined with the formaldehyde-free nitrogen-containing glyoxal resin and the metal salt catalyst attained improvement not only in resistance to water and solvents but also in FF level.

TABLE 3

Binder Formulation

TABLE 3-continued

| Example No. | Co-polymer Emulsion | Glyoxal Resin | Cross-Linking Catalyst | Formulation Ratio (Solids weight basis) |
|---|---|---|---|---|
| Example | | | | |
| 36 | A | X | $MgCl_2$ | 100/5/1.0 |
| 37 | A | Y | $MgCl_2$ | 100/5/1.0 |
| 38 | B | Y | $MgCl_2$ | 100/5/1.0 |
| 39 | C | X | $MgCl_2$ | 100/5/1.0 |
| 40 | C | Y | $MgCl_2$ | 100/2.5/0.5 |
| 41 | C | Y | $MgCl_2$ | 100/2.5/1.0 |
| 42 | C | Y | $MgCl_2$ | 100/5/0.1 |
| 43 | C | Y | $MgCl_2$ | 100/5/0.25 |
| 44 | C | Y | $MgCl_2$ | 100/5/0.5 |
| 45 | C | Y | $MgCl_2$ | 100/5/1.0 |
| 46 | C | Y | $MgCl_2$ | 100/10/1.0 |
| 47 | C | Y | $MgCl_2$/citric acid = 5/1 | 100/5/1.0 |
| 48 | D | Y | $MgCl_2$ | 100/5/1.0 |
| 49 | D | Y | $MgCl_2$ | 100/5/8.5 |
| Comparative Example | | | | |
| 50 | A | — | — | 100/—/— |
| 51 | A | X | — | 100/5/— |
| 52 | A | Y | — | 100/5/— |
| 53 | A | — | $MgCl_2$ | 100/—/1.0 |
| 54 | B | — | — | 100/—/— |
| 55 | B | X | — | 100/5/— |
| 56 | B | Y | — | 100/5/— |
| 57 | B | — | $MgCl_2$ | 100/—/1.0 |
| 58 | C | — | — | 100/—/— |
| 59 | C | X | — | 100/5/— |
| 60 | C | Y | — | 100/2.5/— |
| 61 | C | Y | — | 100/5/— |
| 62 | C | Y | — | 100/10/— |
| 63 | C | — | $MgCl_2$ | 100/—/0.25 |
| 64 | C | — | $MgCl_2$ | 100/—/0.5 |
| 65 | C | — | $MgCl_2$ | 100/—/1.0 |
| 66 | C | — | $MgCl_2$ | 100/—/2.5 |
| 67 | D | — | — | 100/—/— |
| 68 | D | Y | — | 100/5/— |
| 69 | D | — | $MgCl_2$ | 100/—/3.5 |

| Example No. | Dry Tensile Strength (kg/5 cm) | Resistance to Water (kg/5 cm) | Resistance to Solvent (MEK) (kg/5 cm) | Resistance to Solvent (Gasoline) (kg/5 cm) | FF (ppm) |
|---|---|---|---|---|---|
| Example | | | | | |
| 36 | 8.0 | 4.7 | 3.6 | 9 | |
| 37 | 8.3 | 5.1 | 3.4 | 6 | |
| 38 | 8.4 | 5.0 | 3.4 | 10 | |
| 39 | 9.0 | 5.0 | 4.0 | 9 | |
| 40 | 9.4 | 5.0 | 3.8 | 8 | |
| 41 | 9.2 | 5.2 | 3.7 | 7 | |
| 42 | 9.2 | 5.0 | 3.7 | 7 | |
| 43 | 9.4 | 5.2 | 3.9 | 6 | |
| 44 | 9.5 | 5.6 | 4.0 | 5 | |
| 45 | 9.6 | 5.5 | 3.8 | 5 | |
| 46 | 9.3 | 5.4 | 3.9 | 5 | |
| 47 | 9.4 | 5.3 | 3.9 | 6 | |
| 48 | 8.0 | 4.9 | 3.5 | 9 | |
| 49 | 8.0 | 4.8 | 3.3 | 8 | |
| Comparative Example | | | | | |
| 50 | 7.2 | 3.6 | 2.6 | 18 | |
| 51 | 7.5 | 3.9 | 2.8 | 18 | |
| 52 | 7.2 | 4.1 | 2.9 | 15 | |
| 53 | 7.2 | 4.0 | 2.8 | 19 | |
| 54 | 7.3 | 3.5 | 2.5 | 25 | |
| 55 | 7.6 | 3.8 | 2.7 | 24 | |
| 56 | 7.3 | 4.0 | 2.8 | 22 | |
| 57 | 7.3 | 3.9 | 2.7 | 26 | |
| 58 | 8.5 | 4.0 | 3.0 | 17 | |
| 59 | 8.8 | 4.3 | 3.2 | 17 | |
| 60 | 8.7 | 4.4 | 3.0 | 15 | |
| 61 | 8.5 | 4.5 | 3.3 | 14 | |
| 62 | 8.3 | 4.4 | 3.3 | 13 | |
| 63 | 8.8 | 4.3 | 3.2 | 17 | |
| 64 | 9.0 | 4.6 | 3.3 | 17 | |
| 65 | 8.5 | 4.4 | 3.2 | 18 | |
| 66 | 8.3 | 4.2 | 2.5 | 18 | |
| 67 | 7.0 | 3.4 | 2.6 | 26 | |
| 68 | 7.1 | 3.9 | 2.9 | 23 | |
| 69 | 7.1 | 3.8 | 2.4 | 25 | |

As will be apparent from the foregoing description, the present invention provides a binder composition which exhibits not only high resistance to water and solvents but also low FF level, with an improvement in foamability being optionally attainable. The present invention also provides a nonwoven fabric and impregnated paper which has attained improvement in these properties.

While the invention has been described in detail and with reference to specific embodiments thereof, it will be apparent to one skilled in the art that various changes and modifications can be made therein without departing from the spirit and scope thereof.

What is claimed is:

1. A binder composition which comprises:
   (A) a copolymer emulsion which contains as its essential ingredients vinyl acetate, ethylene, and a monomer represented by the formula (1):

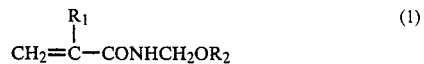

wherein $R_1$ is H or $CH_3$; and $R_2$ is H or an alkyl group having not more than 5 carbon atoms, the proportions of the respective ingredients being within the range of 55–96.5/3–40/0.5–5 on a weight basis;
   (B) a formaldehyde-free nitrogen-containing glyoxal resin;
   (C) a metal salt catalyst; and optionally
   (D) a higher alcohol sulfuric acid ester-based surfactant; wherein said copolymer emulsion, said formaldehyde-free nitrogen-containing glyoxal resin and said metal salt catalyst are present in weight proportions of 100 (copolymer emulsion)/1–10 (formaldehyde-free nitrogen-containing glyoxal resin)/0.05–4 (metal salt catalyst) on a solids content basis.

2. A binder composition according to claim 1, wherein said formaldehyde-free nitrogen-containing glyoxal resin contains 1,3-dimethyl-4,5-dihydroxy-2-imidazolidinone as a main component.

3. A binder composition according to claim 1, wherein said metal salt catalyst is magnesium chloride.

4. A binder composition according to claim 1, wherein said higher alcohol sulfuric acid ester-based surfactant is a lauryl sulfuric acid ester salt.

5. A binder composition according to claim 1, wherein said higher alcohol sulfuric acid ester-based surfactant is a polyoxyethylene lauryl ether sulfate ester salt.

6. A nonwoven fabric containing a binder which comprises:
   (A) a copolymer emulsion which contains as its essential ingredients vinyl acetate, ethylene, and a monomer represented by the general formula:

$$CH_2{=}\overset{\displaystyle R_1}{\underset{|}{C}}-CONHCH_2OR_2 \quad (1)$$

wherein $R_1$ is H or $CH_3$; and $R_2$ is H or an alkyl group having not more than 5 carbon atoms, the proportions of the respective ingredients being within the range of 55–96.5/3–40/0.5–5 on a weight basis;

(B) a formaldehyde-free nitrogen-containing glyoxal resin;

(C) a metal salt catalyst; and optionally (D) a higher alcohol sulfuric acid ester-based surfactant; wherein said copolymer emulsion, said formaldehyde-free nitrogen-containing glyoxal resin and said metal salt catalyst are present in weight proportions of 100 (copolymer emulsion)/1–10 (formaldehyde-free nitrogen-containing glyoxal resin)/0.05–4 (metal salt catalyst) on a solids content basis.

7. A nonwoven fabric according to claim 6, wherein said formaldehyde-free nitrogen-containing glyoxal resin contains 1,3-dimethyl-4,5-dihydroxy-2-imidazolidinone as a main component.

8. A nonwoven fabric according to claim 6, wherein said metal salt catalyst is magnesium chloride.

9. An impregnated paper containing a binder which comprises:

(A) a copolymer emulsion which contains as its essential ingredients vinyl acetate, ethylene, and a monomer represented by the general formula:

$$CH_2{=}\overset{\displaystyle R_1}{\underset{|}{C}}-CONHCH_2OR_2 \quad (1)$$

wherein $R_1$ is H or $CH_3$; and $R_2$ is H or an alkyl group having not more than 5 carbon atoms, the proportions of the respective ingredients being within the range of 55–96.5/3–40/0.5–5 on a weight basis;

(B) a formaldehyde-free nitrogen-containing glyoxal resin;

(C) a metal salt catalyst; and optionally (D) a higher alcohol sulfuric acid ester-based surfactant; wherein said copolymer emulsion, said formaldehyde-free nitrogen-containing glyoxal resin and said metal salt catalyst are present in weight proportions of 100 (copolymer emulsion)/1–10 (formaldehyde-free nitrogen-containing glyoxal resin)/0.05–4 (metal salt catalyst) on a solids content basis.

10. An impregnated paper according to claim 9, wherein said formaldehyde-free nitrogen-containing glyoxal resin contains 1,3-dimethyl-4,5-dihydroxy-2-imidazolidinone as a main component.

11. An impregnated paper according to claim 9, wherein said metal salt catalyst is magnesium chloride.

* * * * *